United States Patent
Takahashi et al.

[11] Patent Number: 5,938,510
[45] Date of Patent: Aug. 17, 1999

[54] DISK CLEANER DEVICE

[75] Inventors: Toshio Takahashi; Minoru Yonekawa; Fumihiko Aiyama, all of Tokyo, Japan

[73] Assignee: Kioritz Corporation, Tokyo, Japan

[21] Appl. No.: 08/801,778

[22] Filed: Feb. 14, 1997

[30] Foreign Application Priority Data

Feb. 16, 1996 [JP] Japan .................................. 8-029463

[51] Int. Cl.⁶ .................................................. B24B 5/00
[52] U.S. Cl. ........................ 451/290; 451/285; 451/287
[58] Field of Search .................................. 451/285, 287, 451/288, 289, 41, 42, 259, 283, 268, 269, 60, 290; 15/77, 88.2, 102, 97.1

[56] References Cited

U.S. PATENT DOCUMENTS

| | | | |
|---|---|---|---|
| 3,065,627 | 11/1962 | Ross | 451/283 |
| 3,860,399 | 1/1975 | Noble et al. | 451/41 |
| 4,179,852 | 12/1979 | Barnett | 451/290 |
| 4,586,296 | 5/1986 | Saunders | 451/290 |
| 4,663,890 | 5/1987 | Brandt | 451/41 |
| 4,825,497 | 5/1989 | Nagao et al. | 15/97.1 |
| 5,003,728 | 4/1991 | Loladze et al. | 451/28 |
| 5,102,099 | 4/1992 | Brown et al. | 451/283 |
| 5,144,711 | 9/1992 | Gill, Jr. | 15/77 |
| 5,297,365 | 3/1994 | Nishioka et al. | 451/57 |
| 5,524,313 | 6/1996 | Sato | 15/88 |
| 5,651,160 | 7/1997 | Yonemizu et al. | 15/77 |

FOREIGN PATENT DOCUMENTS 405077148  3/1993  Japan ..................... 451/290

*Primary Examiner*—David A. Scherbel
*Assistant Examiner*—Derris Holt Banks
*Attorney, Agent, or Firm*—Baker & Botts, L.L.P.

[57] ABSTRACT

For removing a scratch or stain from a surface of a disk such as a CD, a disk cleaner/scourer/polisher device has a scouring member such as a buff. The disk is rotated about its axis, and the buff is pressed against the surface of the disk and rotated also with the axis of rotation of the buff being perpendicular to the surface of the disk, scouring is uniform and does not impair surface flatness. Changing between scouring members, between scratch removal and polishing is facilitated by a lifting mechanism for selectively pressing the corresponding scouring member against the surface.

16 Claims, 7 Drawing Sheets

DISK CLEANER DEVICE

BACKGROUND OF THE INVENTION

1. Field of the Invention

The present invention relates to a disk cleaner/scourer/polisher device for removing a scratch, stain or the like on a surface of a recording disk such as an optical disk or a magnetooptical disk. More particularly, it relates to a device comprising a scouring member, such as a buff, which is pressed against a side of the disk and rotated, with the disk being rotated also thereby to scour the side of the disk.

2. Description of the Prior Art

In recent years, disks such as a laser disk, a compact disk (CD), and a CD-ROM have been widely used as information recording media for acoustic, video and audio-visual applications, with computers and the like. In such a disk, if its surface, in particular its recording surface is scratched, stained or otherwise undesirably affected, its appearance is impaired and pieces of information recorded in that area are unlikely to be read out and reproduced correctly.

To cope therewith, scratches, stains and the like have heretofore been removed manually using a cloth or the like. However, such manual operation is laborious and time-consuming and has a drawback in that scratches, stains or the like may not be removed satisfactorily. In particular, in a secondhand CD shop, CD-rental agency, library or the like which has a large number of disks which are lent or rented out frequently, much labour is unavoidable in removing scratches, stains or the like from disks. Accordingly, it is strongly desired instead to remove scratches, stains or the like mechanically and automatically.

To meet such demand, a disk cleaner has been proposed, for example, in Japanese Unexamined Patent Publication No.122038/1995. The cleaner comprises a cylindrical scouring member, such as a buff, that is circumferentially pressed against a side (recorded side) of a disk to be scoured and is rotated with the disk being rotated also thereby to scour the side of the disk.

However, the proposed disk cleaner has the following drawbacks:

(1) In the proposed disk cleaner, the scouring member is pressed against a side of a disk with its rotational axis in parallel with the side of the disk during scouring. As any portion of the scouring member is necessarily pressed against a portion of the disk which is counter thereto, a distal end portion of the scouring member is pressed against a radially inner portion of the disk, and a proximal end portion of the scouring member is pressed against a radially outer portion of the disk. So, if the cylindricality of the scouring member and the parallelism thereof with the side of the disk being scoured are not precisely maintained, undulations and the like are likely to result in the surface of the disk.

(2) For scouring a disk, it is desired to provide a disk cleaner with both a scouring member for abrasion (for removal of a scratch) and a scouring member for polishing (for lubrication, for finishing). In the proposed disk cleaner, however, only one scouring member can be pressed against the disk. Accordingly, there is a disadvantage in that replacement is frequently required between the scouring member for scratch removal and the scouring member for polishing.

(3) In the proposed disk cleaner, pressing force of the scouring member on the disk cannot be adjusted. As the scouring members become worn or deformed by the scouring operation, a required pressing force of the scouring member may not be maintained without adjustment. As a result, a scratch or stain may not be satisfactorily removed.

(4) The proposed disk cleaner is awkward in use in that for placement or removal of a disk or for replacement of the scouring member, it is necessary to pivot a disk supporting arm together with a driving motor parallel to the disk.

(5) In the proposed disk cleaner, although it is required as described above, precisely to maintain the cylindricality of the scouring member and the parallelism thereof with the side being scoured, no effective means are included to meet this requirement. Accordingly, pressing force of the scouring member against the disk is not uniform across the interface therebetween. This prevents the disk from being evenly scoured.

SUMMARY OF THE INVENTION

The present invention has been made in view of these problems. It is, therefore, an object of the present invention to provide a disk cleaner which is capable of effectively removing a scratch or stain on a disk while minimizing undesired results such as undulation, and which allows changing between scouring members in a simple manner, for good handling properties.

The disk cleaner comprises at least one scouring member, such as a buff, for scouring a side of a disk in such a manner that the scouring member is pressed against the side and rotated, with the disk being rotated to scour the side of the disk. The disk cleaner is characterized in that the scouring member is placed with its rotational axis perpendicular to the side of the disk in scouring.

By placing the scouring member with its rotational axis perpendicular to the side of the disk as described above, the scouring member is pressed evenly against the side. As a result, no substantial uneven wear is caused in the scouring member, evenness of the scouring surface of the scouring member is maintained, and no significant undesired result such as undulation is caused.

In a preferred embodiment of the present invention, the disk cleaner comprises a plurality of scouring member holders respectively holding the scouring members, and the scouring member holders are capable of separately pressing the scouring members respectively held thereby against the side of the disk being scoured. More specifically, the plurality of the scouring member holders are selectively moved toward or away from the disk by means of a cam-operated elevator mechanism.

By virtue of this, if the disk is to be subjected both to scratch removal and to polishing, it is not necessary to replace one scouring member for scratch removal with one for polishing, but only to turn a selection dial for selecting between the scouring member for scratch removal and the scouring member for polishing to be pressed against the disk. Accordingly, good handling properties are conveniently achieved.

In another preferred embodiment of the present invention, pressing force of each of the scouring members on the disk can be adjusted by means of a cam-operated elevator mechanism and/or other means. Accordingly, even if the scouring member is worn or deformed by scouring operation, a predetermined pressing force of each of the scouring members can be exerted on the disk, for effective scratch and stain removal.

In still another preferred embodiment of the present invention, each of the scouring members is cylindrical and the bottom thereof is pressed against the disk. Accordingly, pressing force is substantially uniform for each of the scouring members. It is thereby possible to more evenly scour the disk.

In a further preferred embodiment of the present invention, each of the scouring members has a diameter which is larger than a width in the radial direction of an area of the disk to be scoured. It is thereby possible to scour the disk throughout the area without shifting the scouring member and/or the disk in the radial direction of the disk. Thus, device structure and mechanism can be simplified.

In a still further preferred embodiment of the present invention, during scouring each of the scouring members is biased toward the disk by a coil spring. Accordingly, pressing force is substantially uniform for each of the scouring members. It is thereby possible to scour the disk more evenly.

DESCRIPTION OF A PREFERRED EMBODIMENT

In the following, an embodiment of the present invention will be described with reference to the accompanying drawings.

Figure 1:
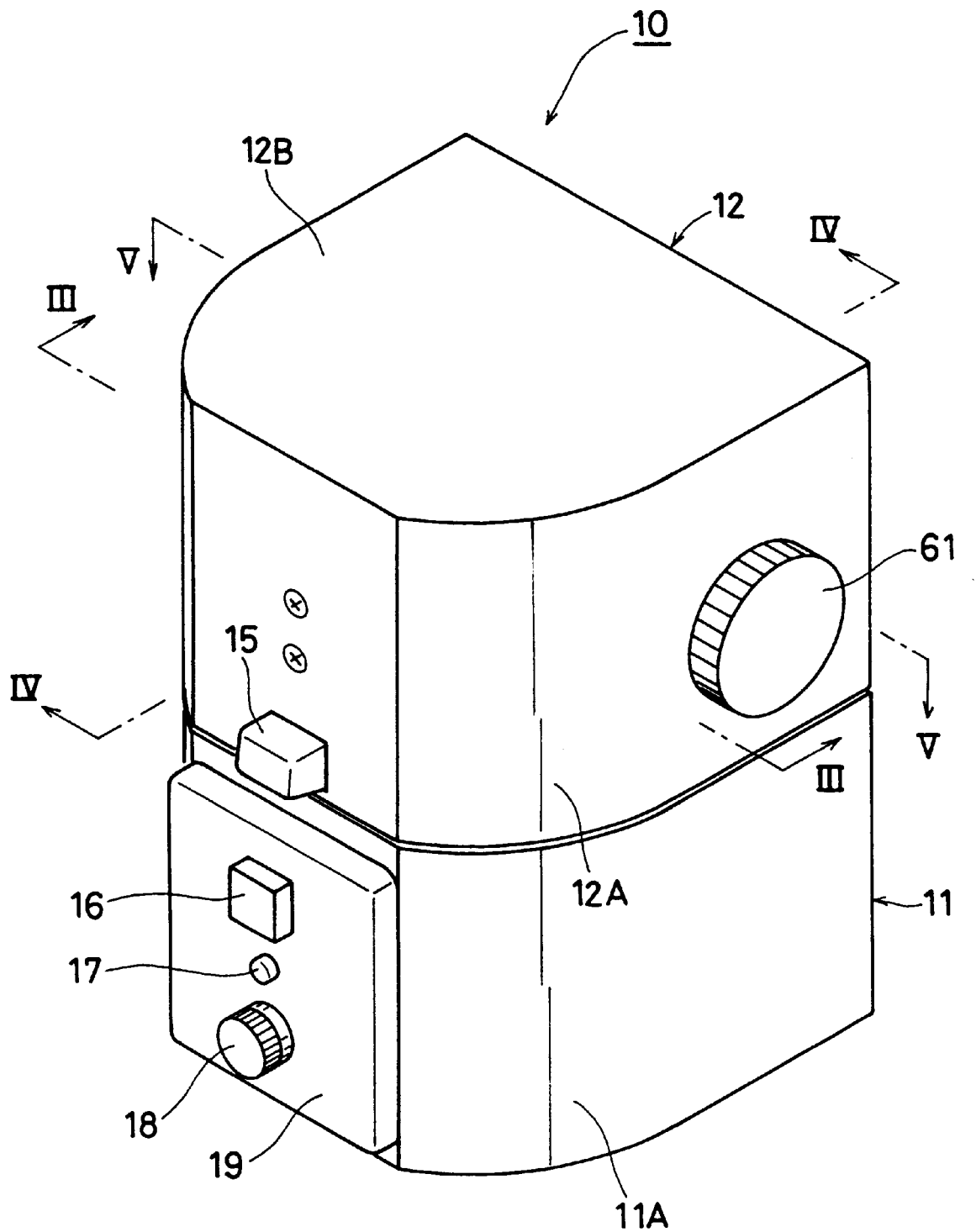
FIG. 1 is a perspective view of an embodiment of the disk cleaner according to the present invention.

FIG. 1 shows the outside of an embodiment of the disk cleaner according to the present invention.

Figure 2:
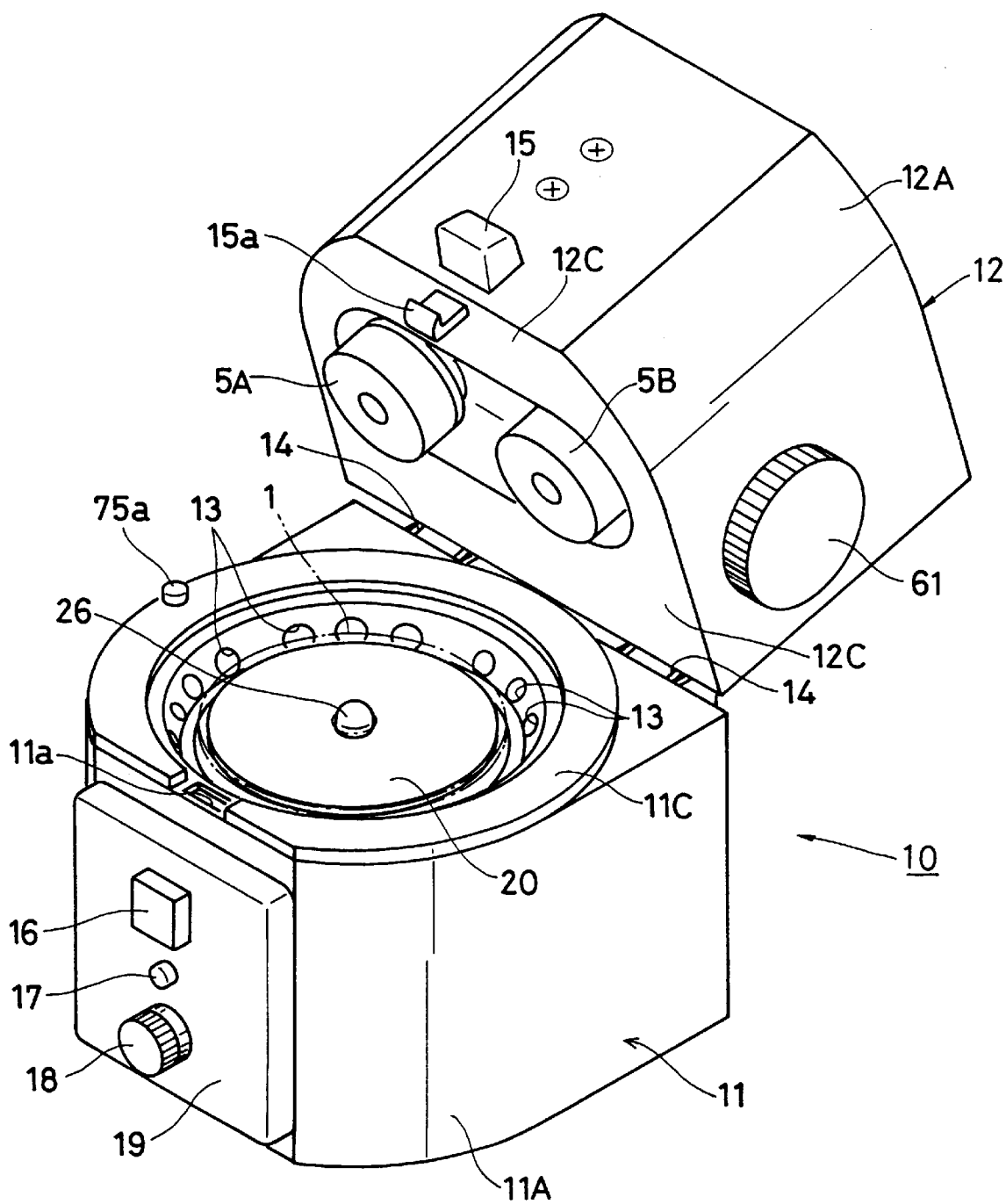
FIG. 2 is a perspective view of the disk cleaner shown in FIG. 1 with an upper housing open.

The disk cleaner 10 of the illustrated embodiment is for scouring a 5-inch disk such as a CD and comprises a lower housing 11 and an upper housing 12 which is pivotally mounted on hinge members 14 (see FIGS. 2 and 4) provided on the rear side of the housing 11, and which is biased so as to be automatically openable upwardly (FIG. 2 shows the disk cleaner 10 with the upper housing 12 fully open). As illustrated also by FIGS. 3 to 5, the lower housing 11 comprises a semi-elliptical side wall 11A, a bottom wall 11B, and an upper supporting plate 11C having a truncated-conical recess (with a trapezoidal cross section). The upper housing 12 comprises a semi-elliptical side wall 12A, a top wall 12B, a bottom plate 12C having a truncated-conical recess opposite to the recess of the upper supporting plate 11C, and a rod holding plate 12D mounted on the upper surface of the bottom plate 12C.

In the lower housing 11, a geared motor 25 for rotating a disk is mounted on the upper supporting plate 11C via a holding sleeve 28 with its output shaft 25a up. The output shaft 25a has a non-circular section, and a spindle 26 is fixedly mounted on the output shaft 25a by a setscrew 26b so as to rotate together with the output shaft 25a. The spindle 26 extends upward through the upper supporting plate 11C in such a manner that its enlarged portion 26a is located above the upper supporting plate 11C. On the enlarged portion 26a, a turn table 20 for placing a disk (CD) 1 is attached, comprising a substrate 21 and a rubber mat 23. The disk (CD) 1 is placed on the turn table 20 with its recorded side (the side to be scoured) 1A up and its unrecorded side (the labelled side) 1B down. Between a portion of the spindle 26 under the enlarged portion 26a and the holding sleeve 28, thrust ball bearings 29 are provided.

In the upper housing 12, four guide rods 41, 42, 43 and 44 are vertically provided to extend bridge-wise between the top wall 12B and the rod holding plate 12D. Each of the guide rods 41 to 44 has its upper and lower ends fixedly held in respective fixing sleeves 45 which are fixed to the top wall 12B and the rod holding plate 12D by welding or the like. By the pair of guide rods 41, 42 located on the left in FIG. 3, a first sliding elevator member 31 including a geared motor 35 for rotating a scouring member 5A described later is slidably held and guided. By the pair of guide rods 43, 44 located on the right in FIG. 3, a second sliding elevator member 32 including a geared motor 35 for rotating a scouring member 5B described later is slidably held and guided in the vertical direction.

In addition to the geared motor 35, the first sliding elevator member 31 comprises a first pair of sliding sleeves 37 slidably fitted respectively on the pair of guide rods 41 and 42, first mounting plates 66 respectively attached to upper and lower ends of the left-hand sliding sleeve 37 of the first sleeve pair and to upper and lower ends of a speed reducer 35A of the geared motor 35 to connect them, a first pair of upper and lower cam lift plates 67 respectively attached to upper and lower ends of the right-hand sliding sleeve 37 of the first sleeve pair and to upper and lower ends of the speed reducer 35A of the geared motor 35 to connect them, and a scouring member holder 50 located under the geared motor 35 to hold the scouring member 5A for scratch removal of the disc (CD).

In addition to the geared motor 35, the second sliding elevator member 32 comprises a second pair of sliding sleeves 37 slidably fitted respectively on the pair of guide rods 43 and 44, second mounting plates 69 respectively attached to upper and lower ends of the right-hand sliding sleeve 37 of the second sleeve pair and to upper and lower ends of a speed reducer 35A of the geared motor 35 to connect them, a second pair of upper and lower cam lift plates 68 respectively attached to upper and lower ends of the left-hand sliding sleeve 37 of the second sleeve pair and to upper and lower ends of the speed reducer 35A of the geared motor 35 to connect them, and a scouring member holder 50 located under the geared motor 35 to hold the scouring member 5B for polishing of the disc (CD).

Figure 6:
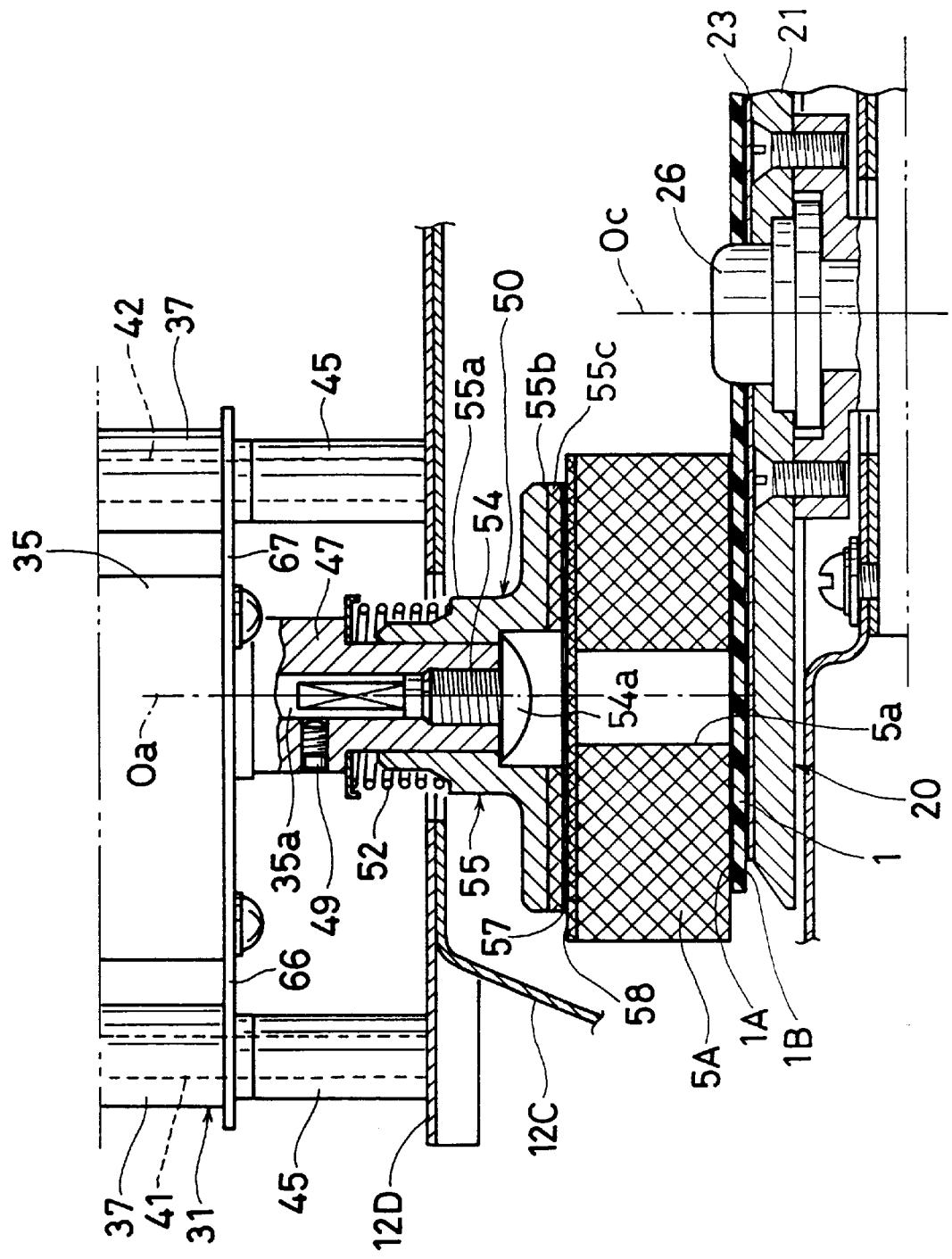
FIG. 6 is an enlarged sectional view of the scouring member and its vicinity shown in FIG. 3.

The scouring member holders 50 provided on the left and right sliding elevator members 31, 32 have the same structure. As shown in FIG. 6 in which the scouring member holder 50 of the first sliding elevator member 31 is illustrated in detail, each of the scouring holder members 50 comprises a stepped connecting shaft 47 fixedly mounted on an output shaft 35a (which is non-circular in cross section) of the geared motor 35 by a setscrew 49 to rotate together with the output shaft 35a; a sliding holder 55 including a stepped body 55a slidably fitted on the connecting shaft 47 and blocked with a round head 54a of a setscrew 54 screwed in the connecting shaft 47 from the bottom, and a collar portion 55b expanding from the bottom of the stepped body 55a; and a coil spring 52 compressedly disposed between the step of the body 55a of the sliding holder 55 and the step of the connecting shaft 47. Thus, the sliding holder 55 is always biased downward by means of the coil spring 52.

Figure 3:
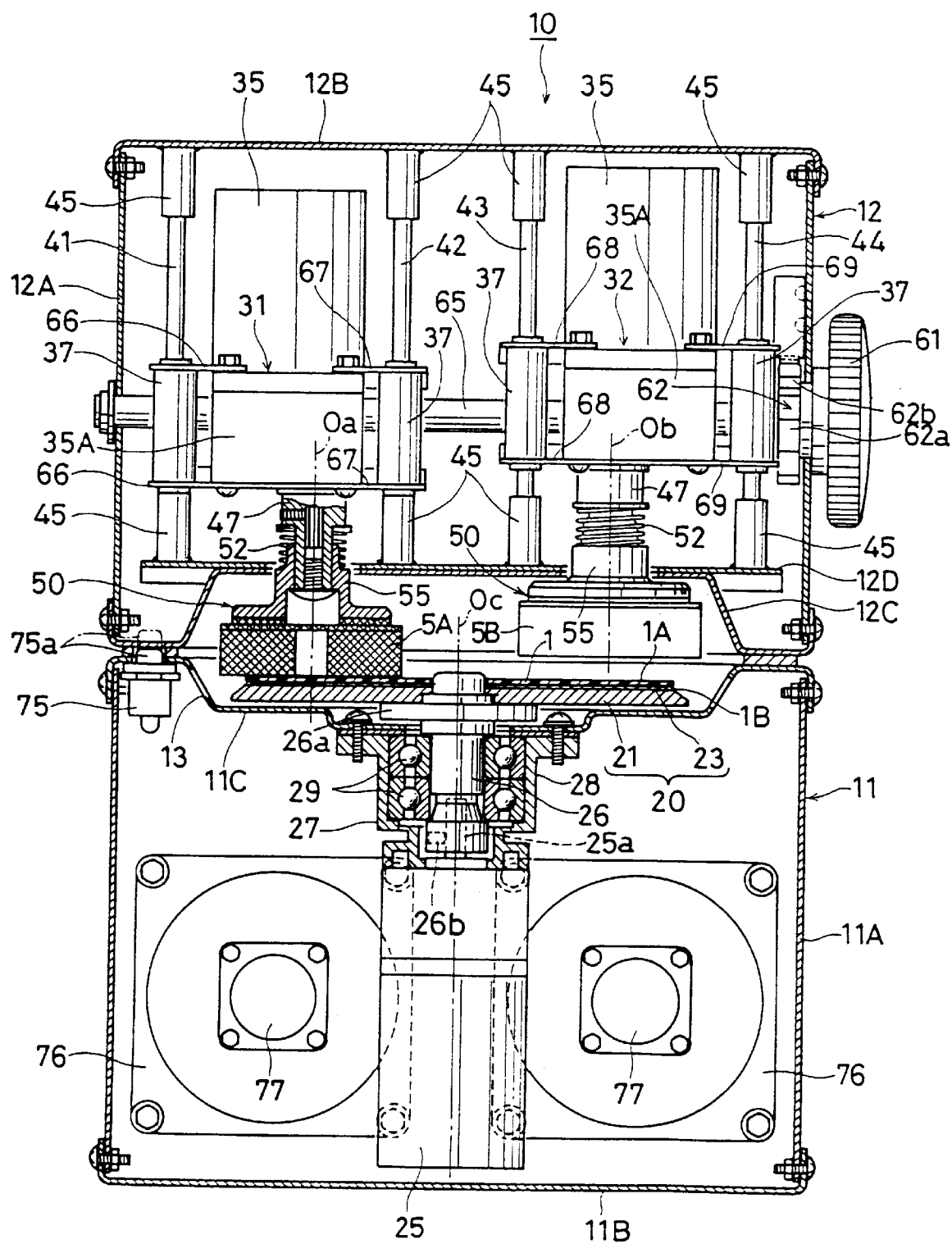
FIG. 3 is a sectional view taken along the line III—III and viewed in the direction of the arrows III in FIG. 1.

Onto the bottoms of the collar portions 55b of the sliding holders 55 of the first and second scouring member holders 50, as shown in FIG. 3 and FIG. 6, the scouring member 5A for scratch removal and the scouring member 5B for polishing of the same shape and size are detachably attached, respectively, in such a manner that the scouring members 5A, 5B are coaxial with the first and second scouring member holders 50, respectively. In other words, the axes of the scouring members 5A, 5B are in alignment with the rotational axes Oa, Ob of the respective scouring member holders 50.

The attachment of the scouring members will be described in detail. For attachment of the scouring member 5A for scratch removal and the scouring member 5B for polishing, to the sliding holders 55, a fastening means is used which is a so-called magic tape and commercially available under the tradename "Berokuro", for example.

Specifically, to the bottom of the collar portion 55b of the sliding holder 55, an annular keeper 57 which is one member of the fastening means is bonded via a suitable cushioning member 55c. To the top of each of the scouring members 5A for scratch removal and 5B for polishing, a circular latch 58 is bonded which is the other member of the fastening means and which has a number of latch pieces. The latch pieces of the latch 58 are pressed against the keeper 57 to effect latching. In consequence, the scouring member 5A for scratch removal and the scouring member 5B for polishing are detachably held by the scouring member holders 50.

Figure 7:
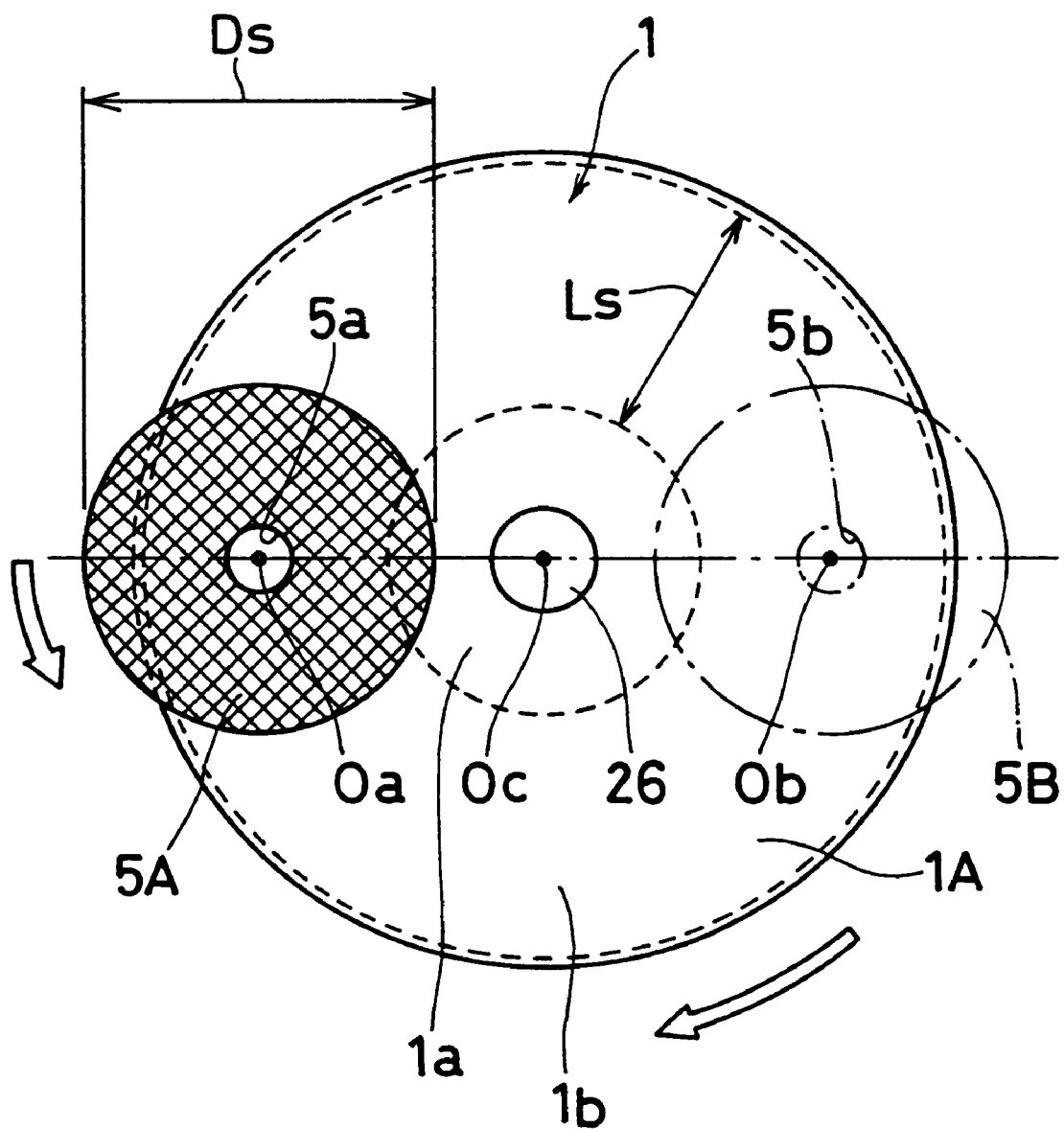
FIG. 7 is a schematic view showing the positional relationship between scouring members of the disk cleaner shown in FIG. 1 and a disk.

The scouring member 5A for scratch removal and the scouring member 5B for polishing are provided with a scourant (scouring material) for scratch removal (for abrasion) and a scourant for polishing. The rotational axes Oa, Ob of the scouring members 5A, 5B are perpendicular to the side 1A of the disk 1 being scoured, and the bottom of the scouring member 5A or 5B is pressed against the side 1A being scoured from above. As shown in FIG. 7, the rotational axes Oa, Ob of the scouring members 5A, 5B are positioned on a straight line passing through the rotational axis Oc of the turntable 20 and of the spindle 26. Further, each of the diameters Ds of the scouring member 5A for scratch removal and the scouring member 5B for polishing is slightly larger than a width Ls in the radial direction of a recorded area 1b to be scoured, of the recorded side 1A of the disk 1, so that circumferential portions thereof slightly extend to an unrecorded portion 1a at the center of the disk 1 and to the outside of the disk 1.

In this embodiment, in order to separately press the scouring member 5A for scratch removal and the scouring member 5B for polishing against the side 1A of the disk 1, the first and second sliding elevator member 31, 32 provided with the scouring member holders 50 are selectively moved toward or away from the side 1A by means of a cam-operated elevator mechanism 60.

Figure 4:
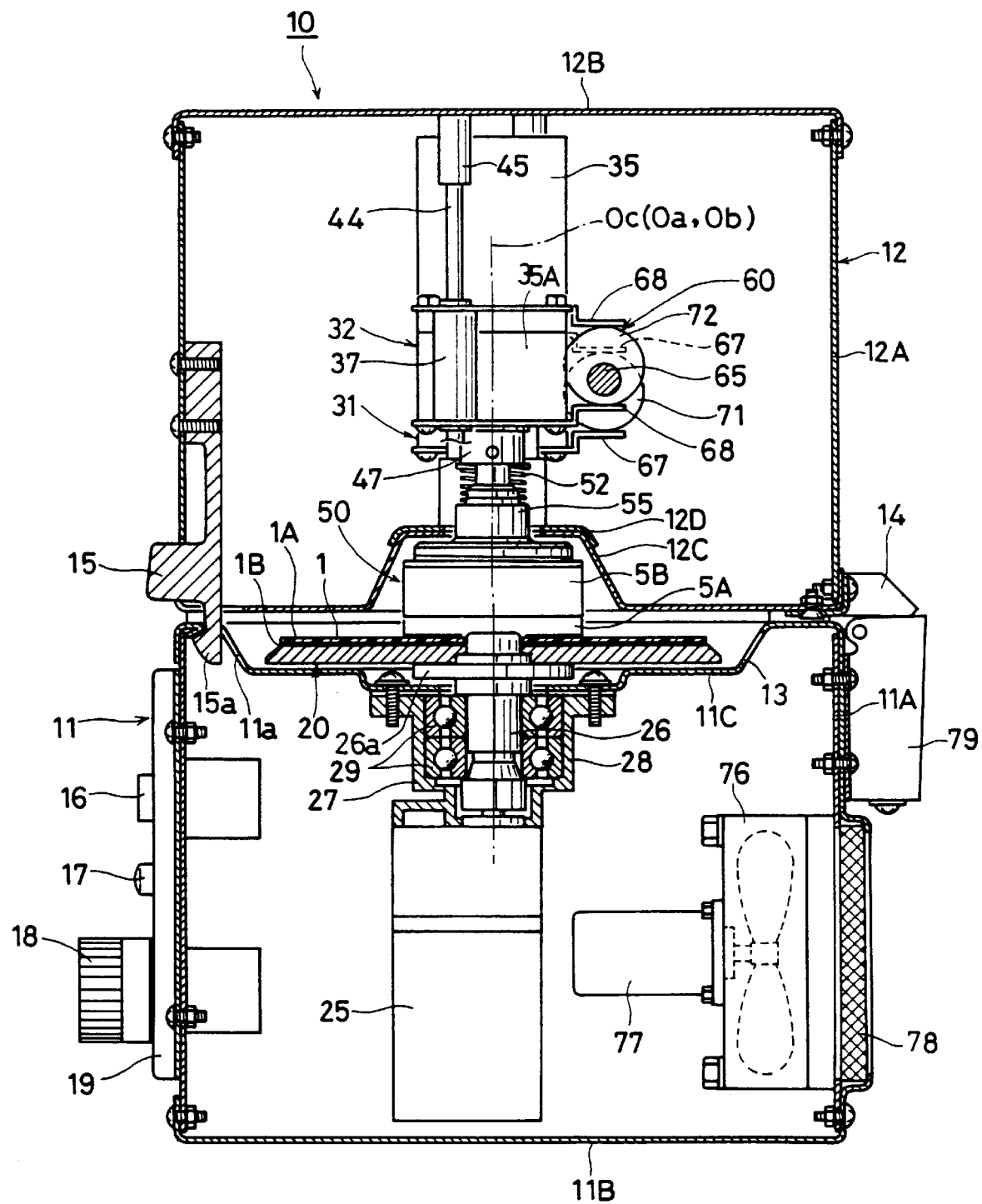
FIG. 4 is a sectional view taken along the line IV—IV and viewed in the direction of the arrows IV in FIG. 1.
Figure 5:
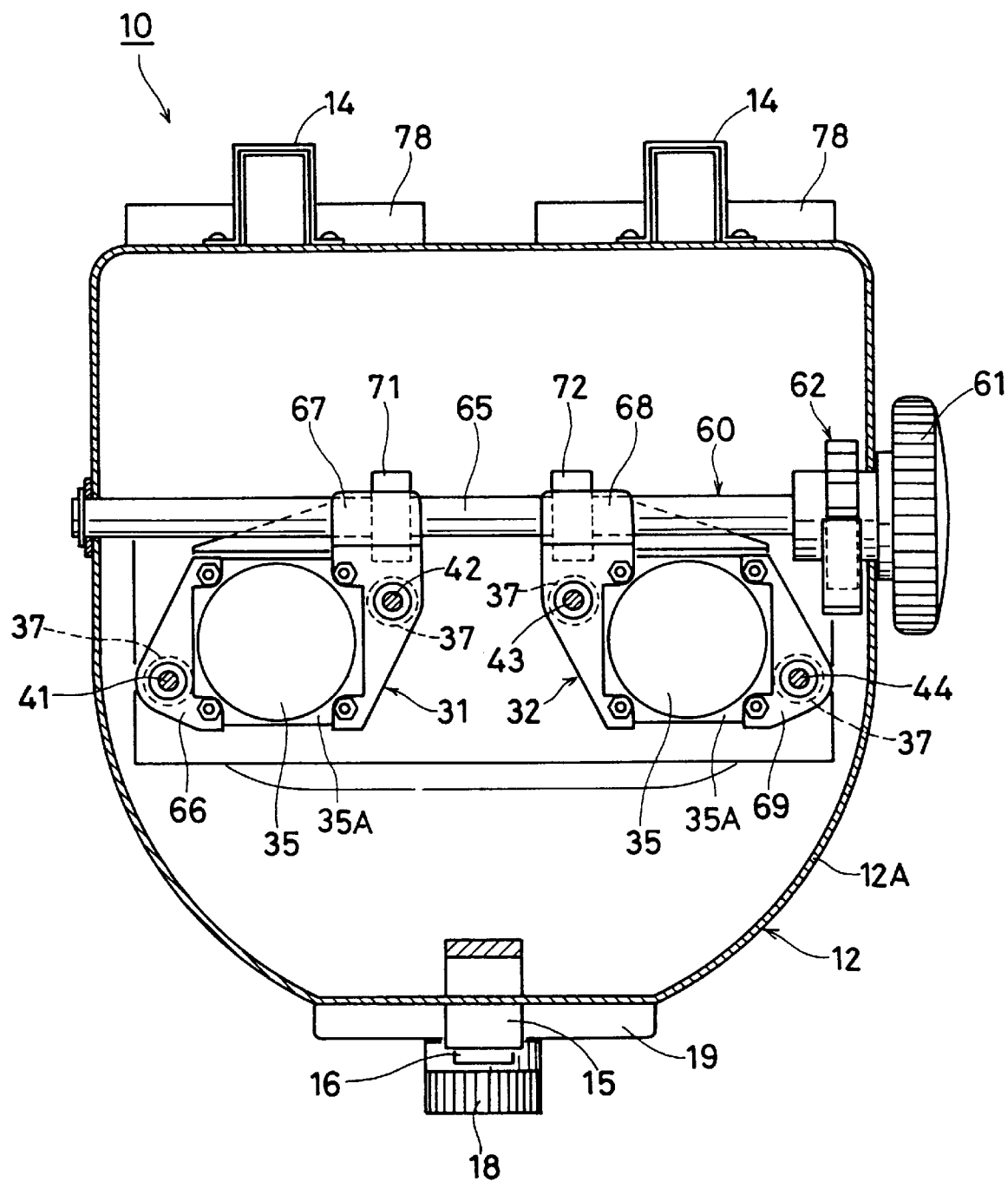
FIG. 5 is a sectional view taken along the line V—V and viewed in the direction of the arrows V in FIG. 1.

As shown in FIGS. 4 and 5 in addition to FIG. 3, the cam-operated elevator mechanism 60 comprises a selection dial 61 located on the right side of the upper housing 12; an operating shaft 65 placed bridge-wise between the right and left sides of the upper housing 12 and having its right end fixedly connected to the selection dial 61 so as to rotate together with the selection dial 61; a ratchet mechanism 62 including a ratchet wheel 62b and a pawl 62a and mounted on a portion of the selection dial 61 in the upper housing 12 in proximity to the right end of the operating shaft 65; a circular disc cam 71 eccentrically and fixedly mounted on the operating shaft 65 at a position somewhat to the left of the middle of the operating shaft 65 in such a manner that the circumferential surface (lift surface) of the cam 71 is slidably in contact with inside surfaces of the first pair of upper and lower cam lift plates 67 of the first sliding elevator member 31; and, with a phase difference of 180 degrees relative to the circular disc cam 71, a circular disc cam 72 eccentrically and fixedly mounted on the operating shaft 65 at a position somewhat to the right of the middle of the operating shaft 65 in such a manner that the circumferential surface (lift surface) of the cam 72 is slidably in contact with inside surfaces of the second pair of the upper and lower cam lift plates 68 of the second sliding elevator member 32.

In the cam-operated elevator mechanism 60 constructed as described above, the first and second sliding elevator members 31 and 32 are alternately lowered with every 180-degree turn of the selection dial 61. In consequence, the scouring member 5A for scratch removal and the scouring member 5B for polishing which are held by the scouring member holders 50 are alternately pressed against the side 1A of the disk 1. Further, by turning the selection dial 61 according to adjustment degrees of the ratchet mechanism 62, the lowered position of the first and second sliding elevator members 31 and 32 can be adjusted. Thus, pressing force of the scoring members 5A, 5B on the side 1A of the disk 1 can be adjusted. In this connection, FIGS. 3 and 4 show the scouring member 5A for scratch removal at the completely lowered position and the scouring member 5B for polishing at the completely raised position.

The upper housing 12 is further provided with a button 15 having a hook 15a at a lower position of its front for opening/closing the upper housing 12. The hook 15a of the button 15 is flexible so as to bend inward/outward in opening/closing of the upper housing 12. When the upper housing 12 is closed, the hook 15a of the button 15 is inserted downward into a locking hole 11a formed at a front end portion of the upper supporting plate 11C to catch thereon, thereby effecting locking. As shown in FIG. 4, on an upper portion of the rear of the lower housing 11, buffer stopper members 79 are provided for stopping the hinge members 14 with the upper housing 12 fully open when the hook 15a is unlocked.

On the front of the side wall 11A of the lower housing 11, an operating panel 19 is mounted. The operating panel 19 is provided with a starting switch 16, an indicator lamp 17, a dial 18 of a timer for setting a scouring time and the like. As shown in FIG. 3, at a left end position of the upper supporting plate 11C of the lower housing 11, a safety switch 75 is provided which is switched from OFF to ON when the upper housing 12 is closed and a button 75a of the safety switch 75 is pushed by the bottom plate 12C of the upper housing 12 to shift from the position shown by the chain-dotted line to the position shown by the solid line in FIG. 3. The disk cleaner 10 of this embodiment is not actuated even if the starting switch 16 is pushed, in case the safety switch 75 is not ON, i.e., when the upper housing 12 is not properly closed.

As shown in FIGS. 2 and 3, in a circumferential oblique portion of the recess of the upper supporting plate 11C of the lower housing 11, a number of outlets 13 are provided for discharging scourings into the lower housing 11, including scouring material dust and the like resulting from scouring of the disk 1 with the scouring member 5A for scratch removal or the scouring member 5B for polishing. In the rear of the lower housing 11, fans 76 powered by motors 77 are internally provided for sucking the scourings, scouring material dust and the like through the outlets 13, and filters 78 are externally provided for collecting the scourings, scouring material dust and the like which are sucked by the fans 76.

Typically, to remove a scratch or stain on the disk 1 by means of the disk cleaner 10 described above, the button 15 is first pushed to open the upper housing 12 (as shown in FIG. 2), and a disk 1 is placed on the turn table 20 with its side 1A to be scoured up. Then, depending on the presence/absence of a scratch or the like in the disk 1 a selection is made whether the scouring member 5A for scratch removal or the scouring member 5B for polishing will be used in the scouring. For example, when only a stain is present and no scratch is observed in the disk 1, the scouring member 5B for polishing is selected. At this time, pressing force of the scouring member 5A or 5B on the disk 1 is also adjusted. The selection and the adjustment are performed by turning the selection dial 61. Then, the upper housing 12 is closed. After the timer dial 18 is appropriately set, the starting switch 16 is pushed.

The turntable 20 is thereby rotated clockwise, as shown in FIG. 7, with the scouring member 5A or 5B selected by turning the selection dial 61 pressed against the side 1A of the disk 1, and the scouring member 5A or 5B pressed against the side 1A of the disk 1 is rotated counterclockwise to increase relative sliding speed. The side 1A of the disk 1 is scoured in this manner, and scourings, scouring material dust and the like are sucked away by the fans 76 and discharged from the upper supporting plate 11C.

For changing from the scouring member 5A for scratch removal to the scouring member 5B for polishing (and vice versa), the selection dial 61 is turned about 180 degrees. The same procedure as described above is performed to carry out scouring.

After completion of the scouring of the disk 1 consequent upon expiration of the scouring time set in the timer, the upper housing 12 is opened and the disk 1 is removed. The above described procedure may be repeated to effect further scouring.

As described above, the rotational axes Oa, Ob of the scouring member 5A for scratch removal and the scouring member 5B for polishing are perpendicular to the side 1A of the disk 1 during scouring. Accordingly, contact areas of any portions of each of the scouring members 5A, 5B with the side 1A are substantially uniform per unit time (per rotation). As a result, no significant uneven wear is caused in the scouring members 5A, 5B, and flatness of the scouring surface (bottom surface) of each of the scouring members 5A, 5B is maintained, thereby substantially preventing undesired undulation or the like.

Further, the two scouring member holders 50 are selectively moved toward or away from the disk 1 by means of the cam-operated elevator mechanism 60 so as to enable the scouring members 5A, 5B held by the respective scouring member holders 50 to be separately pressed against the side 1A of the disk 1. Accordingly, if the disk is to be subjected to both scratch removal and polishing, it is not necessary to replace one of the scouring members 5A for scratch removal and 5B for polishing with the other, but only to turn the selection dial 61 for selecting whether the scouring member 5A for scratch removal or the scouring member 5B for polishing is pressed against the disk 1. As a result, good handling properties are conveniently achieved.

Moreover, the pressing force of each of the scouring members 5A, 5B on the side 1A of the disk 1 can be adjusted by means of the cam-operated elevator mechanism 60. Accordingly, even if the scouring member 5A or 5B is worn or deformed by scouring operation, a predetermined pressing force of each of the scouring members 5A, 5B can be exerted on the disk 1, for effective scratch and stain removal.

Furthermore, each of the scouring members 5A, 5B is cylindrical, and the bottom thereof is pressed against the side 1A of the disk 1. Accordingly, pressing forces and contact areas of any portions of each of the scouring members 5A, 5B with the side 1A of the disk 1 are substantially uniform per unit time (per rotation). It is thereby possible to achieve more uniform scouring of the side 1A of the disk 1.

In addition, each of the diameters Ds of the scouring members 5A, 5B is larger than the radial width Ls of the area 1b to be scoured on the side 1A of the disk 1. It is thereby possible to scour the disk 1 throughout the area 1b to be scoured without shifting the scouring member 5A or 5B and/or the disk 1 in the radial direction of the disk 1. This results in simplified mechanical structure of the device.

Further, since each of the scouring members 5A, 5B is biased during scouring toward the disk 1 by the coil spring 52, the pressing force of each of the scouring members 5A, 5B on the disk 1 is substantially uniform in the contact area therebetween. Accordingly, it is possible to achieve more even scouring of the side 1A of the disk 1.

The present invention has been described in detail with reference to an exemplary embodiment. It is, however, to be understood that the present invention is by no means restricted to the above-described embodiment and that various modifications may be made within the scope which does not depart from the spirit of the present invention as defined in the claims.

For example, the disk cleaner 10 of the above-described embodiment is designed to scour one side of a 5-inch disk such as a CD. It is, however, to be noted that the disk cleaner according to the present invention is not restricted thereto and that in accordance with the teaching disclosed herein, a person having ordinary skill in the art will easily make modifications to obtain a disk cleaner (for scouring a disk having another size or to scour both sides of a disk or the like).

As understood from the above description, the disk cleaner of the present invention has advantages in that a scratch or stain on a disk can be removed effectively without causing significant undesired results such as undulation, and that a change between scouring members can be effected simply and easily.

We claim:

1. A disk cleaner/scourer/polisher device comprising:
    a disk support for supporting a disk having a planar side of which at least an annular portion is free;
    a disk drive operationally coupled to the disk support for rotating the disk support about a first axis which is perpendicular to the planar side of the supported disk;
    at least two holders,
        each for holding a respective scouring member for scouring the annular portion of the planar side of the supported disk,
        each disposed and configured for the held respective scouring member to be brought into localized contact with the annular portion of the planar side of the supported disk, and
        each being operationally coupled to a respective scouring drive for rotating the holder holding the respective scouring member brought into localized contact with the annular portion of the planar side of the supported disk, with the scouring rotation being about a second axis which is perpendicular to the planar side of the supported disk; and each having a respective pressing/lifting mechanism for moving the respective holder relative to the planar side of the supported disk for effecting/breaking the contact of the respective scouring member with the annular portion of the planar side of the supported disk, independent of at least one other of the holders.

2. The device according to claim 1, wherein the pressing/lifting mechanism comprises a cam-operated elevator mechanism.

3. The device according to claim 1, wherein, for each of the holders, a respective scouring drive is included.

4. The device according to claim 1, further comprising means for adjusting contact pressure between the scouring member and the annular portion of the planar side of the supported disk.

5. The device according to claim 1, wherein the holder has a circular mounting face for the scouring member.

6. The device according to claim 5, wherein the holder has a diameter which is greater than a preselected width of the annular portion of the planar surface of the supported disk.

7. The device according to claim 1, further comprising biasing means for biasing the held scouring member for contact with the annular portion of the planar side of the supported disk.

8. The device according to claim 7, wherein the biasing means comprises a coil spring.

9. A disk cleaner/scourer/polisher device comprising:

a disk support for supporting a disk having a planar side of which at least an annular portion is free;

a disk drive operationally coupled to the disk support for rotating the disk support about a first axis which is perpendicular to the planar side of the supported disk;

at least two scouring members,
 each for scouring the annular portion of the planar side of the supported disk,
 each held and configured to be brought into localized contact with the annular portion of the planar side of the supported disk, and
 each being operationally coupled to a respective scouring drive for rotating the respective scouring member brought into localized contact with the annular portion of the planar side of the supported disk, with the scouring rotation being about a second axis which is perpendicular to the planar side of the supported disk; and
 each having a respective pressing/lifting mechanism for moving the respective scouring member relative to the planar side of the supported disk for effecting/breaking the contact of the respective scouring member with the annular portion of the planar side of the supported disk, independent of at least one other of the scouring members.

10. The device according to claim 9, wherein the pressing/lifting mechanism comprises a cam-operated elevator mechanism.

11. The device according to claim 9, wherein, for each of the scouring members, a respective scouring drive is included.

12. The device according to claim 9, further comprising means for adjusting contact pressure between the scouring member and the annular portion of the planar side of the supported disk.

13. The device according to claim 9, wherein the scouring member is cylindrical, having the second axis as cylinder axis.

14. The device according to claim 13, wherein the scouring member has a cylinder diameter which is greater than a preselected width of the annular portion of the planar surface of the supported disk.

15. The device according to claim 9, further comprising biasing means for biasing the scouring member for contact with the annular portion of the planar side of the supported disk.

16. The device according to claim 15, wherein the biasing means comprises a coil spring.

* * * * *